United States Patent
Miller et al.

(10) Patent No.: US 8,635,497 B2
(45) Date of Patent: Jan. 21, 2014

(54) DATA PROCESSING SYSTEM HAVING A SEQUENCE PROCESSING UNIT AND METHOD OF OPERATION

(75) Inventors: Gary L. Miller, Austin, TX (US); Mark Maiolani, East Kilbride (GB); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 275 days.

(21) Appl. No.: 13/170,286

(22) Filed: Jun. 28, 2011

(65) Prior Publication Data

US 2013/0007532 A1    Jan. 3, 2013

(51) Int. Cl.
G06F 11/00    (2006.01)

(52) U.S. Cl.
USPC ............................................. 714/30; 714/45

(58) Field of Classification Search
USPC ................................................ 714/30, 34, 45
See application file for complete search history.

(56) References Cited

U.S. PATENT DOCUMENTS

| | | | |
|---|---|---|---|
| 5,067,130 A | 11/1991 | Jackson | |
| 5,450,349 A | 9/1995 | Brown et al. | |
| 5,657,253 A | 8/1997 | Dreyer et al. | |
| 5,751,735 A | 5/1998 | Tobin | |
| 5,771,240 A | 6/1998 | Tobin et al. | |
| 5,867,644 A | 2/1999 | Ranson et al. | |
| 6,463,553 B1 | 10/2002 | Edwards | |
| 6,487,683 B1 | 11/2002 | Edwards | |
| 6,557,119 B1 | 4/2003 | Edwards et al. | |
| 6,754,852 B2 * | 6/2004 | Swoboda | 714/39 |
| 6,834,360 B2 * | 12/2004 | Corti et al. | 714/37 |
| 7,228,472 B2 | 6/2007 | Johnson et al. | |
| 7,325,164 B2 | 1/2008 | Swanson et al. | |
| 7,348,799 B2 | 3/2008 | Benavides et al. | |
| 7,594,140 B2 * | 9/2009 | Bueti et al. | 714/30 |
| 7,596,719 B2 * | 9/2009 | Pedersen | 714/31 |
| 7,644,310 B2 * | 1/2010 | Kang et al. | 714/30 |
| 7,743,279 B2 * | 6/2010 | Walker et al. | 714/30 |
| 2004/0153838 A1 | 8/2004 | Swanson et al. | |
| 2006/0155516 A1 | 7/2006 | Tyler et al. | |
| 2006/0156290 A1 | 7/2006 | Tyler et al. | |
| 2006/0170452 A1 | 8/2006 | Benavides et al. | |
| 2008/0016408 A1 * | 1/2008 | Abernathy et al. | 714/45 |
| 2010/0023807 A1 * | 1/2010 | Wu et al. | 714/30 |
| 2011/0029830 A1 | 2/2011 | Miller et al. | |
| 2011/0246836 A1 * | 10/2011 | Walker et al. | 714/45 |
| 2012/0151263 A1 * | 6/2012 | Rentschler et al. | 714/30 |
| 2012/0216080 A1 * | 8/2012 | Bansal et al. | 714/45 |
| 2013/0091389 A1 * | 4/2013 | Swoboda | 714/45 |

OTHER PUBLICATIONS

Mayer et al.; SoC Software Debugging and Performance Optimization:; Multi-Core Debug Solution IP; May 2007; 23 Pgs.; IPextreme.

* cited by examiner

*Primary Examiner* — Marc Duncan
(74) *Attorney, Agent, or Firm* — Joanna G. Chiu; Jonathan N. Geld

(57) ABSTRACT

A system includes one or more processors; one or more trace debug circuits configured to monitor one or more of instruction, data, and watchpoint buses of the one or more processors, and record information determined from said monitoring; and a sequence processing unit configured to provide a control signal to a trace debug circuit of the one or more trace debug circuits, wherein in response to the control signal, the trace debug circuit controls one or more of said monitoring and recording, and a system on a chip comprises the one or more processors, the one or more trace debug circuits, and the sequence processing unit.

17 Claims, 7 Drawing Sheets

DATA PROCESSING SYSTEM HAVING A SEQUENCE PROCESSING UNIT AND METHOD OF OPERATION

CROSS-REFERENCE TO RELATED APPLICATION(S)

This application is related U.S. patent application Ser. No. 13/170,289, filed on even date, entitled "DATA PROCESSING SYSTEM HAVING A SEQUENCE PROCESSING UNIT AND METHOD OF OPERATION," naming Gary L. Miller, William C. Moyer, and Mark Maiolani as inventors, and assigned to the current assignee hereof.

BACKGROUND

1. Field

This disclosure relates generally to data processing systems, and more specifically, to a data processing system having a sequence processing unit.

2. Related Art

As today's system-on-chips (SoCs) increase in complexity, it is becoming increasingly difficult to debug the hardware and software and measure performance. This is due, in part, to the high frequency of operation and the limited real-time external visibility due to limited pinouts. External logic analyzers and emulators may be used to debug hardware and software and measure performance; however, their capabilities are limited, especially with today's highly integrated SoCs. For example, external logic analyzers must rely on the existence of signal pinouts or must use delayed serialized transmission, and emulators only mimic characteristics of an SoC.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, a sequence processing unit (SPU) is provided within a data processing system which is capable of proving internal signals of a data processing system and in response thereto, can control the data processing system to perform debug operations and/or performance monitoring. In one embodiment, the SPU is located on-chip such that it is capable of accessing a variety of internal data processing signals. For example, the SPU may be coupled to receive information from an on-chip interrupt controller, which is not externally accessible, to allow for operations to be performed in response to the information received from the interrupt controller. Also, by being located on-chip, the SPU can interface with other on-chip resources. For example, the SPU can configure and control on-chip trace debug circuitry.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
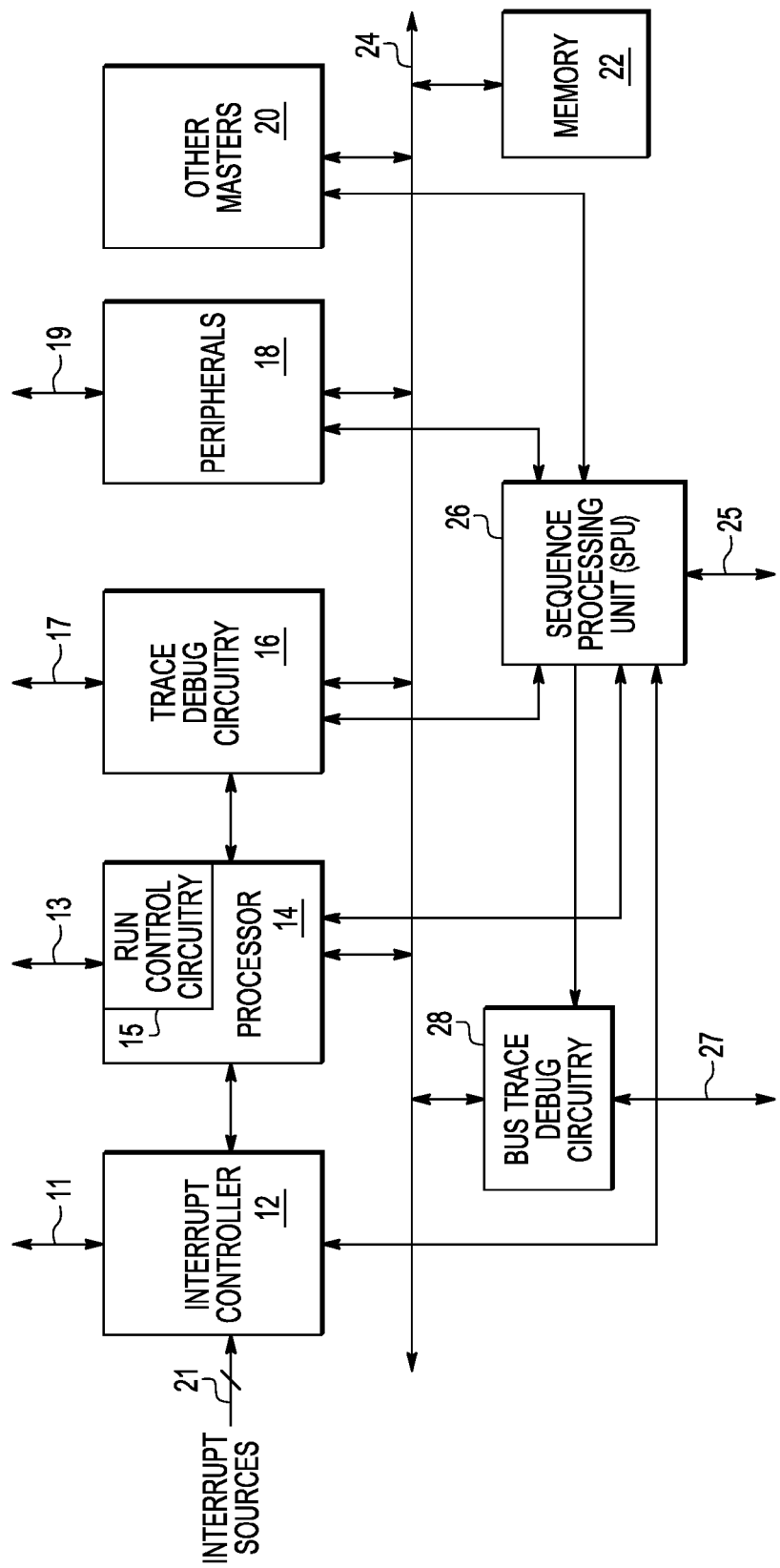
FIG. 1 illustrates, in block diagram form, a data processing system in accordance with an embodiment of the present invention.

FIG. 1 illustrates, in block diagram form, a data processing system 10 in accordance with an embodiment of the present invention. System 10 includes an interrupt controller 12, a processor 14, trace debug circuitry 16, peripherals 18, a memory 22, other masters 20, a sequence processing unit (SPU) 26, bus trace debug circuitry 28, and a system interconnect 24. Processor 14 includes run control circuitry 15, and is bidirectionally coupled to interrupt controller 12 and system interconnect 24. Run control circuitry 15 includes an eternal port 13. Interrupt controller receives a plurality of interrupt source signals 21 from various parts of system 10. For example, they may be received from any of the peripherals in peripherals 18. Interrupt controller also includes an external port 11. Trace debug circuitry 16 is bidirectionally coupled to processor 14 and system interconnect 24, and includes an external port 17. Peripherals 18 is bidirectionally coupled to system interconnect 24 and one or more external ports 19. Peripherals 18 may include any type and number of peripherals, such as, for example, input/output (I/O) devices, timers, memories, etc. Bus trace debug circuitry 28 is bidirectionally coupled to system interconnect 24 and includes an external port 27. Other masters 20 is bidirectionally coupled to system interconnect 24 and may include any type and number of masters such as, for example, other processors, co-processors, direct memory access (DMA) devices, etc. Alternatively, no other masters may be present. Memory 22 is bidirectionally coupled to system interconnect 24 and may be any type of memory, such as, for example, read only memory (ROM), random access memory (RAM), etc. System interconnect 24 may be implemented as a system bus, or alternatively, as a cross-bar switch or other type of interconnect fabric. SPU 26 is bidirectionally coupled to each of interrupt controller 12, processor 14, trace debug circuitry 16, bus trace debug circuitry 28, each of peripherals 18, each of other masters 20. SPU 26 also includes an external port 25. In one embodiment, data processing system 10 is an SoC and is located on a single chip or single integrated circuit. Also, more or fewer than the units illustrated within system 10 may include an external port for communicating external to system 10.

In operation, processor 14, peripherals 18, other masters 20, interrupt controller 12, and memory 22 operate as known in the art. However, SPU 26, as will be described in further detail below, receives information from each of interrupt controller 12, processor 14, peripherals 18, and other masters 20, and in response thereto, SPU 26 is able to control various elements of system 10. For example, in one embodiment, SPU 26 is capable of interfacing and controlling trace debug circuitry 16. In one embodiment, SPU 26 is able to generate complex debug events, based upon input triggers from sources throughout system 10. SPU 26 can create a state machine to trigger various actions, such as debug actions, based on conditions created from the input triggers. Single or multiple actions can be triggered by the state machine, which can result in the creation of various debug events of varying complexity. Also, counters and timers within SPU 26 are available for counting or timing events. Operation of SPU 26, interrupt controller 12, run control circuitry 15, and trace debug circuitry 16 will be described in further detail below.

Figure 2:
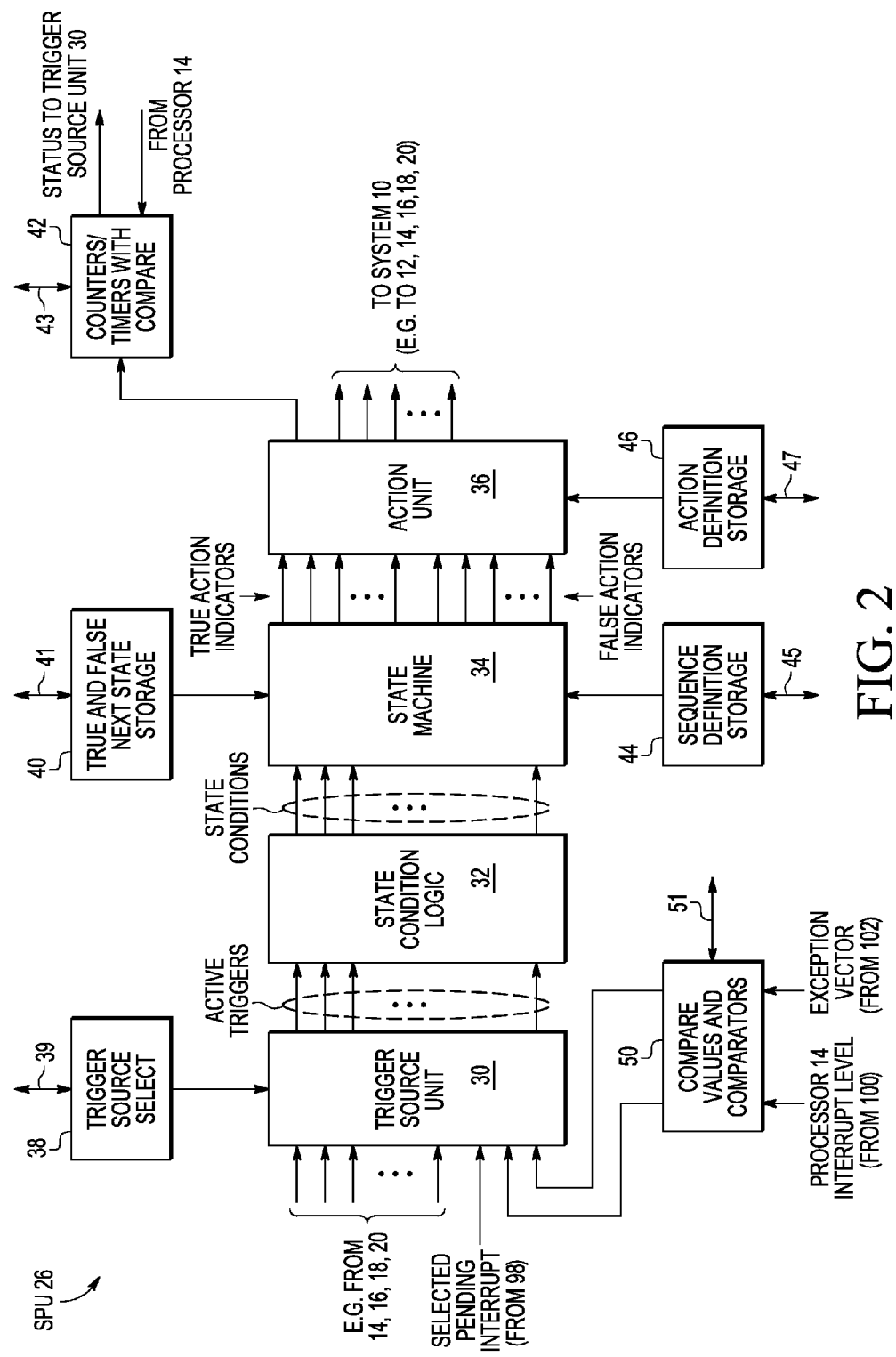
FIG. 2 illustrates, in block diagram form, a sequence processing unit (SPU) of FIG. 1 in accordance with an embodiment of the present invention.

FIG. 2 illustrates, in block diagram form, SPU 26 in accordance with an embodiment of the present invention. SPU 26 includes a trigger source unit 30, state condition logic 32, a state machine 34, and action unit 36, a counters/timers with compare circuitry 42, compare values and comparators 50, trigger source select storage circuitry 38, true and false next state storage circuitry 40, sequence definition storage circuitry 44, and action definition storage circuitry 46. Trigger source unit 30 receives signals from a variety of different sources and locations within system 10, such as, for example, from processor 13, trace debug circuitry 16, peripherals 18, and other masters 20, receives selected pending interrupts from interrupt controller 12, and is coupled to compare values and comparators 50, and trigger select storage circuitry 38. Trigger source unit 30 also provides an integer number of active triggers to state condition logic 32. State condition logic 32 provides an integer number of state conditions to state machine 34. state machine 34 is coupled to true and false next state storage circuitry 40 and sequence definition storage circuitry 44, and provides an integer number of true action indicators and an integer number of false action indicators to action unit 36. Action unit 36 is coupled to action definition storage circuitry 46 and counters/timers with compare circuitry 42, and provides an integer number of action signals to various locations within system 10, such as, for example, to interrupt controller 12, processor 14, trace debug circuitry 16, peripherals 18, and other masters 20. Counters/timers with compare circuitry 42 receives an input from processor 14, and provides status information to trigger source unit 30. Compare values and comparators circuitry 50 receives an interrupt level of processor 14 from interrupt controller 12 and an exception vector from processor 14.

Note that each of trigger source select storage circuitry 38, true and false next state storage circuitry 42, counters/timers with compare circuitry 42, compare values and comparators circuitry 50, sequence destination storage circuitry 44, and action definition storage circuitry 47 includes conductors 39, 41, 43, 51, 45, and 47, respectively, to allow for communication with external ports. For example, the external ports may allow for user configuration, such as, for example, by way of a test port.

In operation, trigger source unit 30 takes inputs from system 10 and uses these inputs to generate active triggers to provide to state condition logic 32. For example, in one embodiment, trigger source unit 30 receives 512 trigger signals from various places within system 10. These trigger signals may correspond to various watchpoints set up throughout system 10. For example, these watchpoints may be generated when certain conditions are met within system 10. In one example, watchpoints may be generated by run control circuitry 15 within processor 14 which monitors operation of processor 14. For example, debug registers and comparators may be used to indicate when an instruction address of processor 14 compares favorably to (e.g. matches) a first compare value (where this may correspond to a first watchpoint) or to indicate when an instruction address of processor 14 compares favorably to (e.g. matches) a second compare value (where this may correspond to a second watchpoint). Note that in one embodiment these compare values and compares may be performed by run control circuitry 15, as will be described below in reference to FIG. 6. In an alternate embodiment, watchpoints may be generated by other logic in processor 14 in response to compare events, pipeline events, or in response to other operations. Another watchpoint may correspond to occurrence of a particular debug event within processor 14, which may also be determined by run control circuitry 15. Also, debug registers and comparators may be used to indicate when a data address of processor 14 matches a first data address compare value (which may correspond to yet another watchpoint of system 10), or when a data address of processor 14 matches a second data address compare value (which may correspond to yet another watchpoint of system 10). Note that watchpoints may also be received from other units within system 10, such as other masters 20, peripherals 18, or system interconnect 20.

The trigger signals received by trigger source unit 30, in addition to or instead of watchpoint indications, may indicate performance monitor events from processor 14, peripherals 18, and/or other masters 20, may include status signals from various counters and timers within system 10, may indicate execution of special instructions (such as, for example, a move to a special purpose register of processor 14), may indicate writes to special purpose registers, may indicate interrupt execution and/or pending interrupt information, may include peripheral status signals, etc. For example, as illustrated in FIG. 2, selected pending interrupts (received from interrupt controller 12) is also provided as a trigger signals to trigger source unit 30, as are the outputs of compare values and comparators circuitry 50. For example, compare values and comparators circuitry 50 may include storage circuitry for storing a compare value for the interrupt level and a compare value for the exception value, and a trigger signal may be provided based on a comparison between the compare value for the interrupt level and the processor 14 interrupt level and a trigger signal may be provided based on a comparison between the compare value for the exception vector and the currently executing exception vector (from processor 12). In this manner, as will be described in more detail below, SPU 26 can base conditions and actions on the particular interrupt level of processor 14 or on the exception vector currently being processed by processor 14. Note that other compare values and comparators may be used to receive the interrupt level and exception vector of other processors within system 10 and provide trigger signals accordingly to trigger source unit 30. Therefore, note that any number of trigger signals may be provided to trigger source unit 30.

In one embodiment, a subset of all received trigger sources is provided as the active triggers to state condition logic 32.

For example, in one embodiment, trigger source unit 30 may include selection circuitry to select 64 triggers from the 512 received triggers to provide to as the active triggers. In one embodiment, the selection circuitry includes an integer number of multiplexers (MUXes). In one example, trigger source unit 30 includes 64 MUXes, each having 8 inputs. Trigger source select storage circuitry 38 may store the control information used for selecting the active triggers from the input triggers. Trigger source select storage circuitry 38, for example, provides an appropriate select signal to each of the 64 MUXes such that 64 active triggers are generated and provided to state condition logic 32. Note that, in alternate embodiments, any number of trigger signals may be received by trigger source unit 30 and any number of those may be provided or selected as the active triggers.

State condition logic 32 implements a particular number of states which may represent logical combinations of the active triggers received from trigger source unit 30. For example, in one embodiment, state condition logic 32 implements 8 states, each of which generates one corresponding state condition. Each state may include combinational logic allowing logical AND/logical OR operations on inputs from trigger source unit 30 to form state conditions. For example, a state condition can be formed by combinations of logical ANDing and logical ORing of signals, variables, addresses, and data (which can be received by way of trigger source unit 30). These state conditions are then provided to state machine 34 to create one or multiple state machines (i.e. sequences). Note that the state conditions can include operands that are a signal (a scalar value), a variable value (e.g. a counter or a timer value), an address value, and a data value from a source (e.g. processor 14, system interconnect 24).

Figure 3:
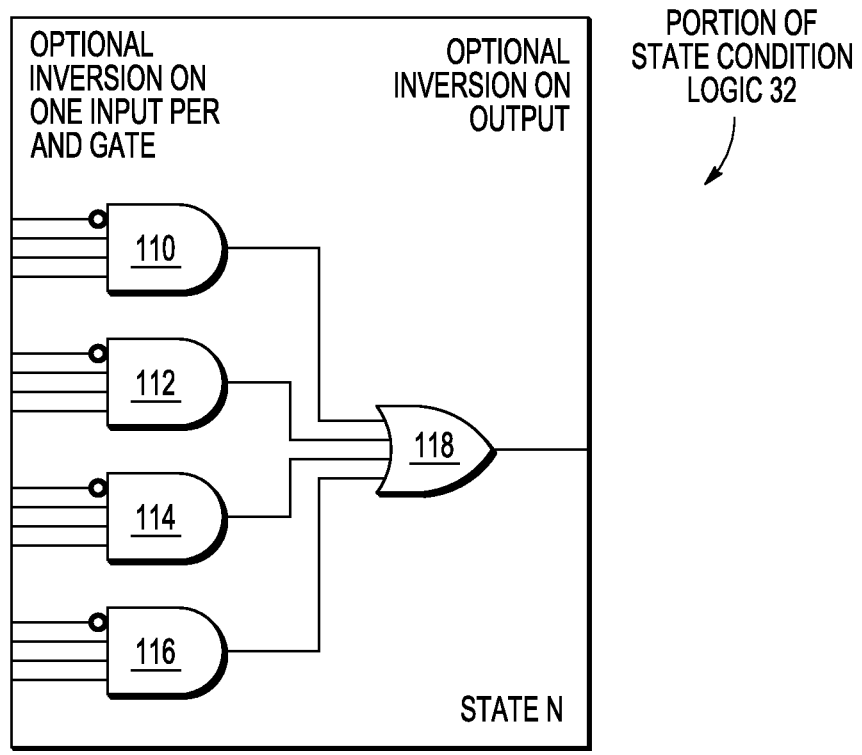
FIG. 3 illustrates, in schematic form, a portion of state condition logic of FIG. 2, in accordance with an embodiment of the present invention.

FIG. 3 illustrate, in schematic form, an example of a state N of state condition logic 32. State N includes 4 AND gates 110, 112, 114, and 1126, the outputs of which are ORed together by OR gate 118 to provide a state condition at the output of OR gate 118. In the illustrated embodiment, each AND gate can have up to 4 inputs, selected from any of the active triggers. Furthermore, the first input of each AND gate allows for the option to invert an active trigger. Also, in one embodiment, OR gate 118 may include a user selectable option to invert its output. In the example described above, state condition logic 32 includes 8 states (states 0 to 7), each like state N of FIG. 3. The inputs to each AND gate of each state can be selected from the active triggers by the user. Note that one active trigger can be provided to multiple inputs of state condition logic 32. For example, one active trigger can be provided to multiple inputs of an AND gate of a state and can be provided to multiple states. In alternate embodiments, each state may use different logic gates from those illustrated in FIG. 3, and may use different logic gates in each state of state condition logic 32.

Referring back to FIG. 2, state machine 34 receives the state conditions (8 in the current example) and implements configurable state machines to create sequences based on the state conditions. In one example, state machine 34 can implement up to 4 simultaneous sequences using the 8 state conditions. In one embodiment, each state can only be used in one unique sequence. However, in alternate embodiments, any number of sequences can be supported, in which more or fewer state conditions may be used, depending on the number of state conditions which can be generated by state condition logic 32. Sequence definition storage circuitry 44 may store the states which are included in each sequence. For example, state machine 34 may implement 3 sequences, the first using states 0 and 1, the second using states 2, 3, and 4, and the third using states 5 and 6. Note that, in this example, state 7 is not used. These sequence definitions (e.g. which sequences includes which states) may be stored in storage circuitry 44. Therefore, state machine 34 can create complex triggers by joining states together with IF, THEN, ELSE type operations to create a sequence, an example of which will be described in reference to FIG. 4.

In one embodiment, a sequence implements a state machine in which the state being evaluated may be referred to as the "active state". Therefore, in a sequence a condition is only evaluated for the active state while conditions for the non-active states within the same sequence will be ignored. In one embodiment, each sequence has the ability to optionally trigger one or more actions based on a true or a false condition from any state in the sequence. In one embodiment, each state in a sequence has the ability to route to another state on a true condition, and route to another state on a false condition. True and false next state storage circuitry 40 in FIG. 2 may be used to store the next state for each state's true condition and each state's false condition. Typically, each state sets up a condition which if true causes one or more true actions to occur, if any, and the sequence proceeds to a subsequent state (e.g. a "true" next state) and if false causes one or more false actions to occur, if any, and then proceeds to a subsequent state (e.g. a "false" next state). The condition of each state may include, for example, determining if a signal is rising/falling/asserted/negated, if a variable equals or does not equal a particular value, if a variable is in or out of a particular range, if an address equals or does not equal a particular address value, etc. Also, as described above, one condition may include logical combinations of various conditions.

Figure 4:
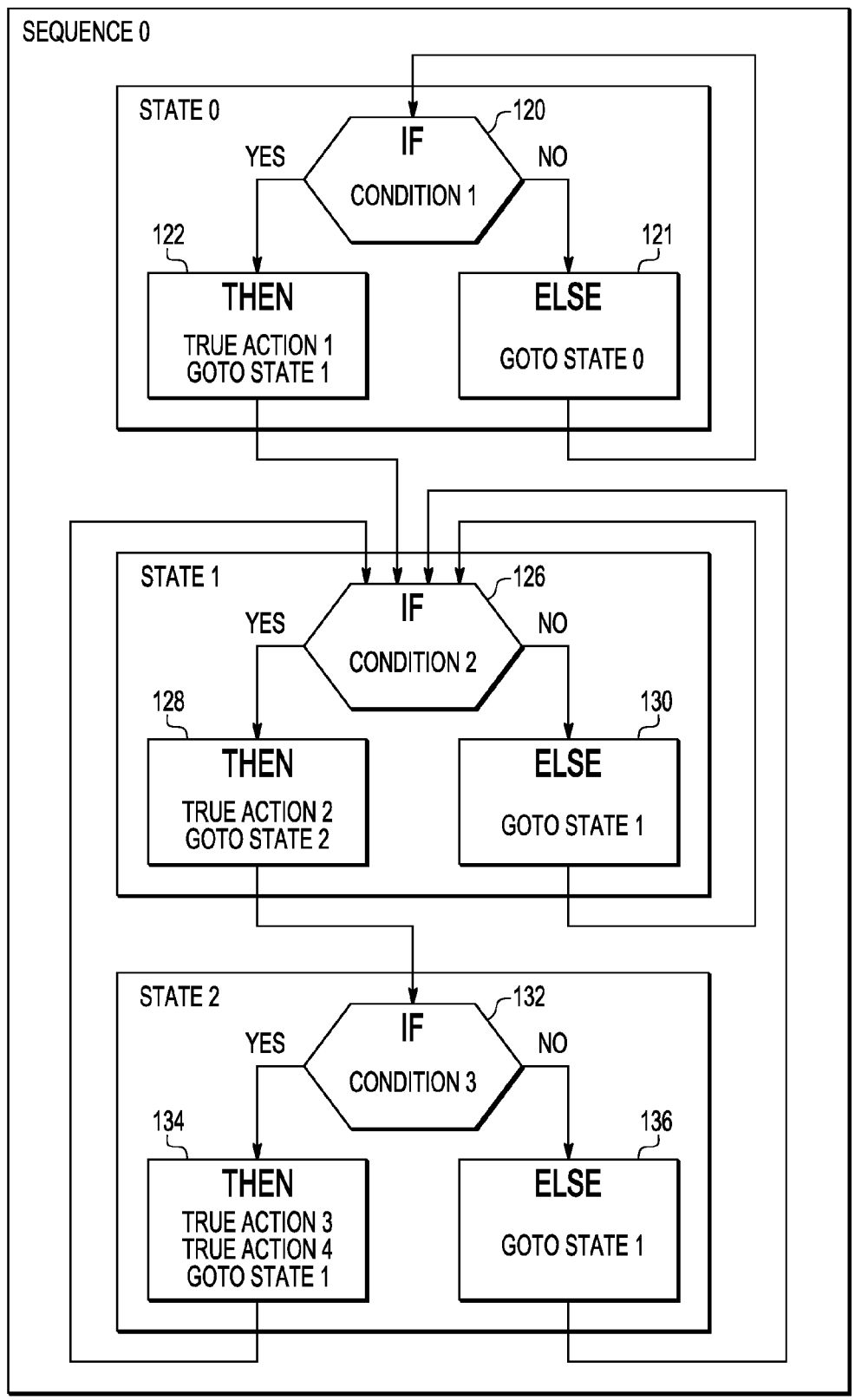
FIG. 4 illustrates, in diagrammatic form, a sequence in accordance with an embodiment of the present invention.

FIG. 4 illustrates, in diagrammatic form, an example of a configurable IF, THEN, ELSE sequence which may be implemented by state machine 34. Sequence 0 of FIG. 4 uses states 0, 1 and 2. In state 0, Condition1 is evaluated in decision diamond 120. If Condition1 evaluates as true, then True Action1 is performed in block 122 and the sequence proceeds to the next state, state 1. If Condition1 evaluates as false, then no action is performed and the sequence remains in state 0, returning to decision diamond 120, as indicated in block 124. In state 1, Condition2 is evaluated in decision diamond 126. If Condition2 evaluates as true then TrueACtion2 is performed in block 128 and the sequence proceeds to the next state, state 2. If Condition2 evaluates as false, then no action is performed and the sequence remains in state 1, returning to decision diamond 126, as indicated in block 130. In state 2, Condition3 is evaluated in decision diamond 132. If Condition3 evaluates as true then TrueAction3 and TrueAction4 is performed in block 134 and the sequence proceeds back to state 1 (to decision diamond 126). If Condition3 evaluates as false, then no action is performed and the sequence returns to state 1 (to decision diamond 126). Therefore, sequence 0 of FIG. 4 can be represented by the following IF, THEN, ELSE statements:

IF Condition1, THEN TrueAction1, Goto State 1; ELSE Goto State 0.

IF Condition2, THEN TrueAction2, Goto State 2; ELSE Goto State 1.

IF Condition3, THEN TrueAction3, TrueAction4, Goto State 1; ELSE Goto State 1.

As an example, Condition1 may refer to processor 14 entering a specific function, such as by checking when there is an address match in processor 14 (which can be provided by a watchpoint from processor 14, as was described above). TrueAction1 may refer to starting a timer within SPU 26 (such as a timer within counters/timers with compare circuitry 42). Therefore, once processor 14 has entered the specific function, the timer in SPU 26 is started. Condition2 may refer to a variable being equal to a specific value such as by checking when there is a data value match in processor 14 (which can be provided by a watchpoint from processor 14, as was described above). TrueAction2 may refer to updating a counter within SPU 26 (which may also be within counters/timers with compare circuitry 42). Therefore, once the variable is equal to the specific value, the SPU counter is updated. Condition 3 may refer to the SPU counter value exceeds a threshold. TrueAction3 may refer to injecting the SPU timer value into a trace message and TrueAction4 may refer to resetting the SPU counter. Therefore, once the SPU counter exceeds the threshold, the SPU timer value is injected into a trace message and the SPU counter is reset. Therefore, note that the status outputs of counters/timers with compare circuitry 42 can be provided as inputs to trigger source unit 30 such that they can be monitored and used to generate state conditions accordingly. Also, although not illustrated in the example of FIG. 4, actions (e.g. FalseActions) can be performed when a condition evaluates as false. In this manner, each sequence of state machine 34 is capable of creating complex triggers. State machine 34 provides true action indicators and false action indicators to action unit 36 which then provides the necessary signals to system 10 for implementing the desired actions.

Action unit 36 therefore receives action requests (true action indicators and false action indicators) and may convert the action requests into one or more actions. The actions for each type of action request may be stored, for example, in action definition storage circuitry 46. That is, the user can define actions associated with each state. These actions may include, for example: starting or stopping trace for a source; starting, stopping, incrementing a counter or timer; resetting a timer or counter; capturing a counter or timer value and placing the specified value into a trace stream; halting a device; generating a watchpoint trigger; capturing a global time base and placing it into a trace stream; generating an interrupt; generating a pulse; starting or stopping a performance counter, such as of processor 14; starting or stopping traces performed by trace debug circuitry 16. For example, in one embodiment, an action request provided to action unit 36 may cause action unit 36 to provide an action of starting or stopping a particular type of trace within trace debug circuitry 16. That is, action unit 36 may control trace debug circuitry 16 so that trace debug circuitry 16 may start or stop a particular trace. In one embodiment, trace debug circuitry 16 is capable of performing the following traces: a data trace (DTM), an ownership trace (OTM), a program trace (PTM), and a watchpoint trace (WTM). Therefore, action unit 36 is capable of controlling trace debug circuitry 16 to start or stop any of these trace streams. Also, action unit 36 is capable of configuring trace debug circuitry 16 to configure traces accordingly. In one embodiment, action unit 36 is capable of searching action definition storage circuitry 46 (which may be implemented as a memory or as a lookup table) for an entry which indicates an action associated with a particular action request and can generate one or more control signals accordingly.

Figure 5:
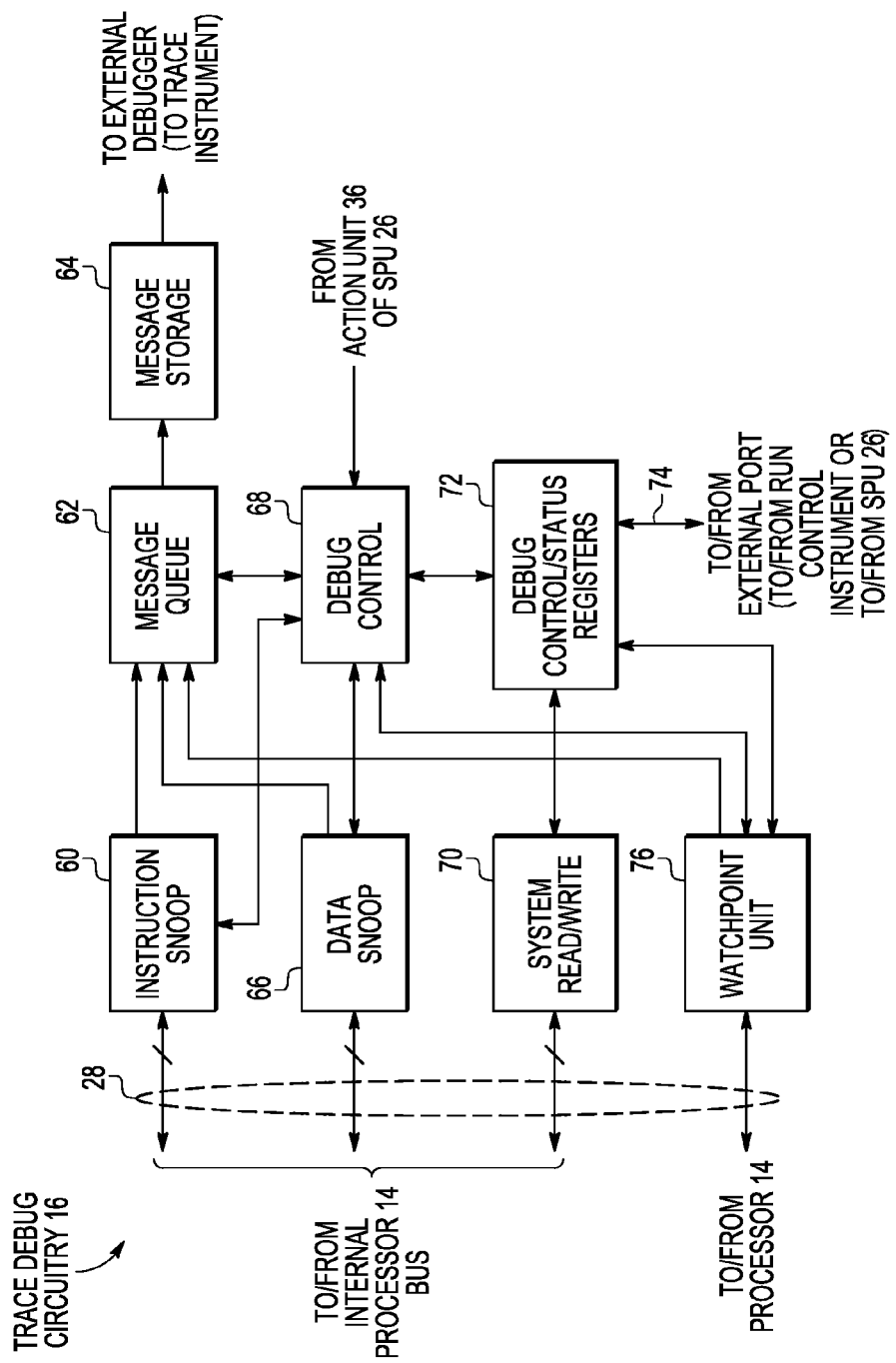
FIG. 5 illustrates, in block diagram form, debug trace circuitry of FIG. 1 in accordance with an embodiment of the present invention.

FIG. 5 illustrates, in block diagram form, trace debug circuitry 16 in accordance with an embodiment of the present invention. Trace debug circuitry 16 includes an instruction snoop 60, a data snoop 66, a message queue 62, a message generator 64, a system read/write unit 70, a watchpoint unit 76, debug control/status registers 72, and debug control circuitry 68. Message queue 62 is coupled to instruction snoop 60, data snoop 66, watchpoint unit 76, and message generator 64. Each of instruction snoop 60, data snoop 66, system read/write 70, and watchpoint unit 76 communicate with processor 14 by way of interface 28. Each of instruction snoop 60, data snoop 66, and system read/write 70 are coupled to the internal bus of processor 14. Watchpoint unit 76 may be coupled to receive a watchpoint bus from run control circuitry 15 of processor 14, as will be described below. Debug control/status registers is coupled to watchpoint unit 76 and system read/write 70. Debug control circuitry 68 is coupled to message queue 62, instruction snoop 60, data snoop 66, system read/write 70, and watchpoint unit 76. Message generator 64 is coupled to provide messages to an external debugger, such as an external trace instrument. Debug control/status registers communicates via conductors 74 in order to communicate with an external run control instrument or with SPU 26. For example, the debug control registers can be configured by either an external tool (such as a run control instrument) or can be configured by SPU 26, or by debug software executing on processor 14. For example, based on the sequences and conditions and triggers of SPU 26, SPU 26 can configure debug control/status registers 72 accordingly. Action unit 36 of SPU 26 also provides information to debug control 68 so that SPU 26, as described above, can control the starting and stopping of various different types of traces.

In operation, debug control 68 is capable of controlling traces performed by trace debug circuitry 16. Instruction snoop 60 and data snoop 60 monitor values on the internal bus of processor 14, where based on the snooped values and the debug control registers (in debug control/status registers 72), messages can be created and placed into message queue 62. These messages can then be provided, in turn, to message generator 64 which generates the messages for providing to an external trace instrument. Also, note that tracing and messaging may also be controlled based on watchpoints received from processor 14 (such as from run control circuitry 15) which are monitored by watchpoint unit 76. System read/write unit 70 generates system reads and writes, such as reads and writes from and to memory 22. For example, system read/write unit 70 may transfer information between external debug logic and memory 22 in response to commands sent to debug control/status registers 72 via conductors 74. Debug control/status registers 72 also store trace related configuration and status. For example, control registers within debug control/status registers 72 allows for the configuration of multiple kinds of traces (e.g. data trace messaging (DTM), ownership trace messaging (OTM), program trace messaging (PTM), and watchpoint trace messaging (WTM)). In one embodiment, debug control/status registers 72 may also allow for the setting up of additional watchpoints, and/or the setting up of address ranges for tracing and/or watchpoint generation. Therefore, trace debug circuitry 16 may be configured to monitor one or more of instruction, data, and watchpoint buses of processor 14, and can record information determined from the monitoring, producing debug trace messages as required. Action unit 36 of SPU 26 may provide one or more control signals to debug control/status registers 72. These one or more control signals can control the monitoring, recording, and trace message generation performed by trace debug circuitry 16. Therefore, SPU 26 is capable of accessing debug control/status registers 72 for configuration so that SPU 26 is also capable of setting up various kinds of traces. Also, by interfacing with debug control 68, SPU 26 is capable of starting and stopping various types of traces which are capable of being implemented by trace debug circuitry 16. Trace debug circuitry 16 may receive commands from and respond to an external control instrument as to when to start and stop traces; however, debug control 68 can receive actions directly from SPU 26 to independently start and stop the various types of traces. Furthermore, the starting and stopping of the various types of traces can be done in response to complex debug events, as defined by the sequences of state machine 34 based on the conditions generated from the active triggers.

Figure 6:
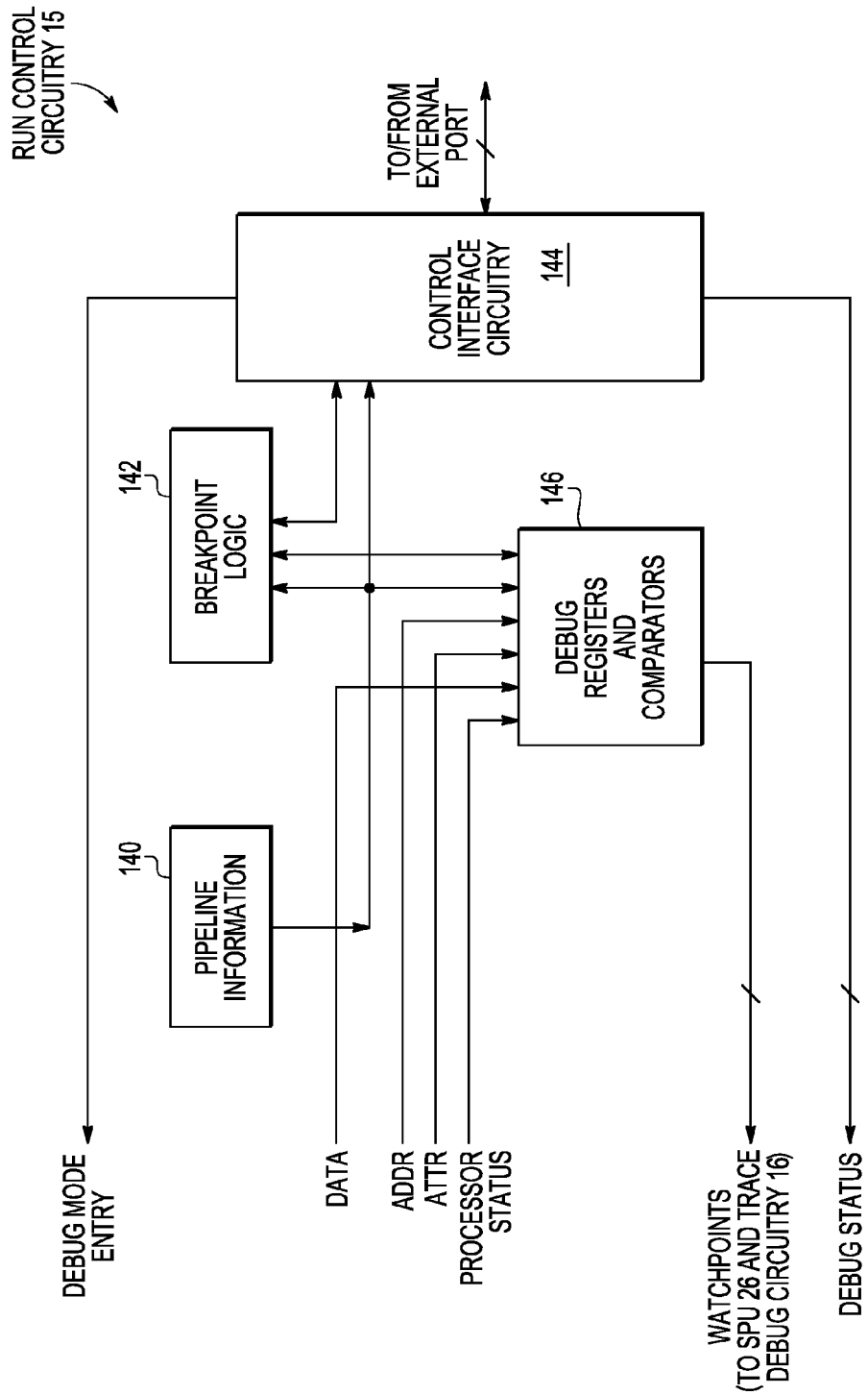
FIG. 6 illustrates, in block diagram form, run control circuitry of FIG. 1 in accordance with one embodiment of the present invention.

FIG. 6 illustrates, in block diagram form, run control circuitry 15 in accordance with an embodiment of the present invention. Run control circuitry 15 includes breakpoint logic 142, control interface circuitry 144, and debug registers and comparators 146. Control interface circuitry 144 communicates with an external port, such as port 13 of FIG. 1. This allows run control circuitry 15 to communicate with an external debugger. Control interface circuitry 144 provides a debug mode entry signal to processor 14 to indicate entry into debug mode. Control interface circuitry 144 is also coupled to breakpoint logic 142, is coupled to receive pipeline information 140 from the pipeline of processor 14, and also provides a debug status to processor 14. Debug registers and comparators 146 is coupled to breakpoint logic 142 and control interface circuitry 144, and is coupled to the data, address, and attribute bus of processor 14, is coupled to receive pipeline information 140, and is coupled to receive the processor status of processor 14. Debug registers and comparators 146 provides watchpoint signals to SPU 26 and trace debug circuitry 16, as has been described above.

In operation, run control circuitry 15 provides various debug resources which may be used to control debug operations of processor 14. Run control circuitry 15 is capable of setting up breakpoints and can perform address and data value compares for both reads and writes. For example, debug registers and comparators 146 may be configured to create debug events and generate breakpoints, exceptions, etc., when specified conditions exist as described earlier. In response to these debug events, processor 14 may selectively be placed into a debug halted mode, may be presented with a debug interrupt, and/or may remain unaffected such that only watchpoints are generated when one or more specific debug events occur. Therefore, note that the watchpoints generated by run control circuitry 15 from processor 14 can be provided as inputs to watchpoint unit 76 of trace debug circuitry 16 as well as to trigger source unit 30 of SPU 26. Note that run control circuitry 15 can be more intrusive than trace debug circuitry 16. The traces set up by trace debug circuitry 16 are typically non-intrusive and do not affect operation of processor 14; however, run control circuitry 15 may be intrusive, such as by generating break points (interrupts) for processor 14, or causing processor 14 to enter a debug halted mode.

In the illustrated embodiment, FIG. 1 includes trace debug circuitry 16 which is tightly coupled to processor 14 and provides trace debug for processor 14. If other processors are present in system 10 (such as within other masters 20), each processor may also have corresponding trace debug circuitry similar to trace debug circuitry 16 for processor 14. Also, each processor may also include run control circuitry similar to run control circuitry 15. Therefore, SPU 26 can receive trigger inputs from other run control circuitries or trace debug circuitries, and may configure and/or control other trace debug circuitries in a manner similar to trace debug circuitry 16. Note that since trace debug circuitry 16 is tightly coupled to processor 14 and provides trace debug for processor 14, trace debug circuitry 16 may also be referred to as processor trace debug circuitry. Other trace debug circuitries may be coupled to other masters (such as within other masters 20), other peripherals (such as within peripherals 19), or system interconnect 24 (such as bus trace debug circuitry 28), in which these trace debug circuitries may provide trace debug for the corresponding circuitry (master, peripheral, bus). These other trace debug circuitries may also allow for trace control of the corresponding circuitry which may be controlled by a control signal from SPU 26 in a similar manner as was described above in reference to trace debug circuitry 16 and the control signal received from action unit 36 of SPU 26 by debug control 68. For example, in the case of bus trace debug circuitry 28, it may be responsive to trace actions from SPU 26, such as starting/stopping traces (e.g. DTM and WTM). In one embodiment, bus trace debug circuitry 28 is only responsive to SPU 26, and is also accessible to external tools by way of external port 27.

Figure 7:
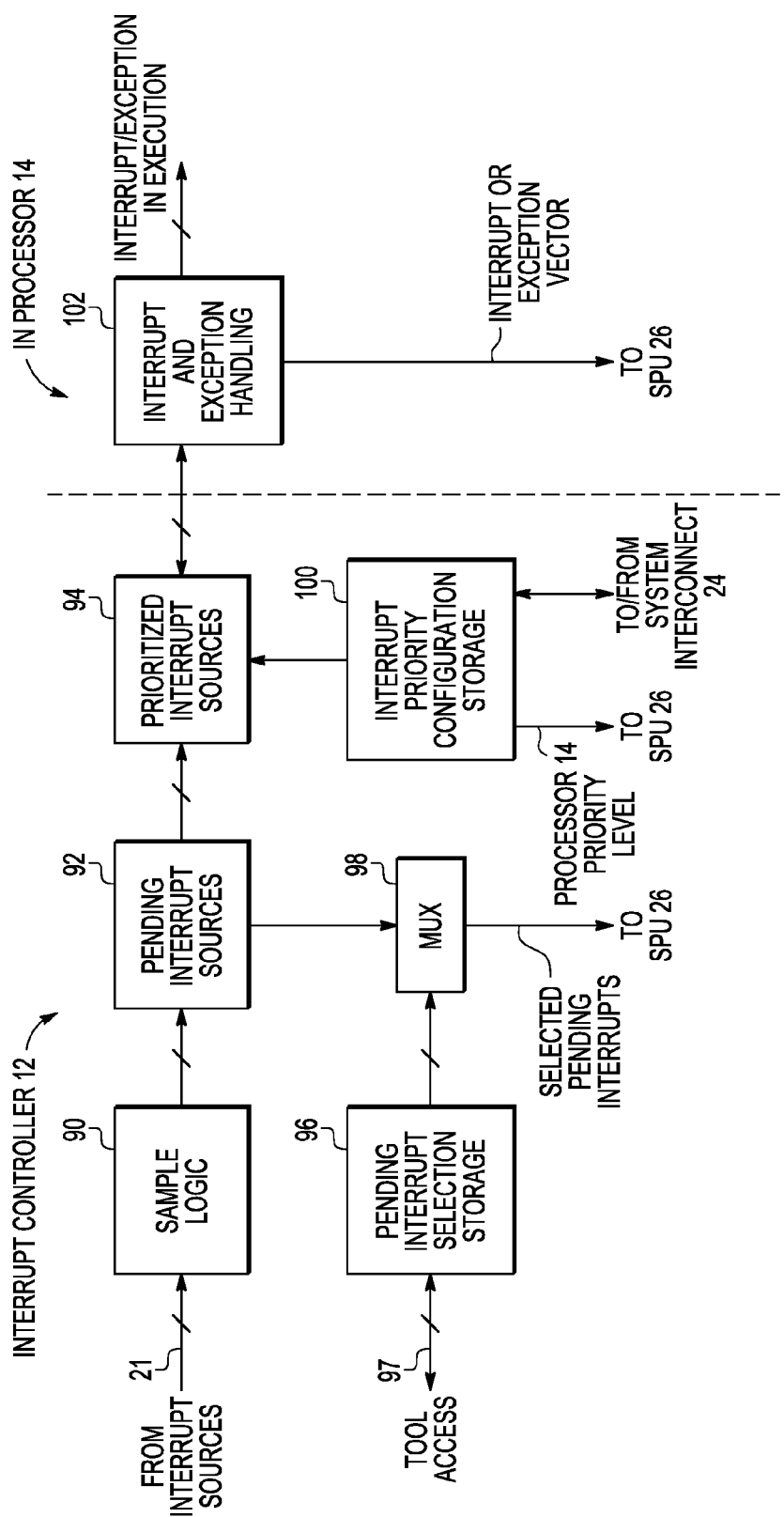
FIG. 7 illustrates, in block diagram form, an interrupt controller and a portion of a processor of FIG. 1 in accordance with one embodiment of the present invention.

FIG. 7 illustrates, in block diagram form, interrupt controller 12 and a portion of processor 14 in accordance with an embodiment of the present invention. Interrupt controller 12 includes sample logic 90, pending interrupt sources 92, prioritized interrupt sources 94, pending interrupt selection storage circuitry 96, multiplexor (MUX) 98, and interrupt priority configuration storage circuitry 100. Processor 14 includes interrupt and exception handling unit 102. Sample logic 90 receives interrupt signals from various interrupt sources by way of conductors 21. Sample logic 90 provides the received interrupts to pending interrupt sources 92. Prioritized interrupt sources 94 prioritizes the pending interrupts from pending interrupt sources 92 in accordance with the information stored in interrupt priority configuration storage circuitry 100 and provides the prioritized interrupts to interrupt and exception handling of processor 14 accordingly. Interrupt and exception handling 102 provides the interrupts for execution.

In one embodiment, interrupt priority configuration storage circuitry 100 provides processor 14 priority level to SPU 26 (to compare values and comparators circuitry 50) which indicates the current interrupt priority level of processor 14. Interrupt priority configuration storage circuitry 100 is also coupled to system interconnect 24 so that it may be configured, as needed, by system 10. In this manner, a state condition can be set based on an interrupt priority level of processor 14, or on a change in priority level of processor 14 or of an interrupt. Also, interrupt and exception handling 102, in addition to providing the current exception vector to processor 14 for execution, provides the current exception (or interrupt) vector to compare values and comparators 50 of SPU 26. In this manner, a state condition can be set based on execution of a particular type of exception or an exception from a particular peripheral or other system interrupt source number. For example, in one embodiment, a subset of the bits of the exception vector provide an exception type of the exception, and a masked comparison may be performed on this subset of bits by compare values and comparators circuitry 50 such that a match is generated and provided to trigger source unit 30 when a particular type of exception is being executed in processor 14. In one embodiment, another subset of the bits of the exception vector may provide the peripheral or other system interrupt source number, and a masked comparison may be performed on this subset of bits such that a match is generated and provided to trigger source unit 30 when a particular peripheral or other system interrupt source number is the source of the interrupt or exception. Also, trigger source unit 30 may receive pending interrupts as possible trigger inputs. However, in the illustrated embodiment, only a selected subset of pending interrupts is provided to trigger source unit 30. Therefore, MUX 98 selects a subset of the pending interrupts from pending interrupt sources 92 according to the selection criteria stored in pending interrupt selection storage 96, and provides these selected pending interrupts to trigger source unit 30. Pending interrupt select storage 96 may be configured by an external tool by way of conductors 97.

Therefore, interrupt information from either or both interrupt controller 12 and processor 14 can be provided to SPU 26 as trigger inputs so that state conditions can also be generated based on pending interrupts and/or interrupt execution. For example, trace debug circuitry 16 may be controlled by SPU 26 in response to interrupt related triggers received from interrupt controller 12. In one embodiment, action unit 36 of SPU 26 can provide a control signal to debug control 68 of trace debug circuitry 16 (to, for example, cause performance of a trace or debug action) in response to state conditions generated from triggers received from interrupt controller 12.

In the illustrated embodiment, FIG. 1 includes interrupt controller 12 which is tightly coupled to processor 14 and provides interrupt information as trigger signals to trigger source unit 30 (or as inputs to comparators, such as compare values and comparators circuitry 50, which provide trigger signals to trigger source unit 30). If other processors are present in system 10 (such as within other masters 20), each processor may also have corresponding interrupt controller similar to interrupt controller 12 for processor 14. Therefore, SPU 26 can receive trigger inputs from other interrupt controllers and may use these trigger inputs to generate state conditions which can be used to control other on-chip resources, such as to configure or control trace or debug actions in a manner similar to what was described in reference to interrupt controller 12.

Therefore, by now it should be appreciated that there has been provided an SPU capable of controlling on-chip trace debug circuitry in response to complex sequences and capable of utilizing interrupt information as trigger inputs for generating state conditions. In this manner, increased flexibility can be achieved with greater coverage and improved real-time performance.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, a variety of different or additional inputs may be used by SPU 26 and a variety of different or additional actions may be performed or controlled by SPU 26. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a system including one or more processors; one or more trace debug circuits, coupled to the one or more processors, and configured to monitor one or more of instruction, data, and watchpoint buses of the one or more processors, and record information determined from said monitoring; and a sequence processing unit, coupled to the one or more trace debug circuits, and configured to provide a control signal to a trace debug circuit of the one or more trace debug circuits, wherein in response to the control signal, the trace debug circuit controls one or more of said monitoring and recording, and a system on a chip comprises the one or more processors, the one or more trace debug circuits, and the sequence processing unit. Item 2 includes the system of item 1, wherein the sequence processing unit further comprises an action unit configured to convert a received action request into the control signal. Item 3 includes the system of item 2 wherein the sequence processing unit further includes a state machine configured to provide the action request to the action unit, wherein the action request is generated in response to state conditions associated with the one or more processors. Item 4 includes the system of item 2, wherein the sequence processing unit further includes a memory, coupled to the action unit, and storing one or more entries associating action requests with actions; and the action unit is further configured to search the memory for an entry comprising an action associated with the action request, and generate the control signal in response to the action associated with the action request. Item 5 includes the system of item 1 wherein the trace debug circuit performs one of starting or stopping a trace in response to the control signal, wherein the trace comprises said monitoring and recording. Item 6 includes the system of item 5 wherein the trace comprises one or more of a data trace, an ownership trace, a program trace and a watchpoint trace. Item 7 includes the system of item 1 wherein the trace debug circuit is configured to capture one of a counter or timer value and place the value into a trace stream in response to the control signal, wherein the trace stream includes information received during said monitoring. Item 8 includes the system of item 1 wherein the trace debug circuit is configured to capture a global time base value of the system and place the value into a trace stream in response to the control signal, wherein the trace stream includes information received during said monitoring.

Item 9 includes a method performed by a sequence processing unit coupled to one or more processors, the method includes generating an action request in response to one or more state conditions associated with the one or more processors; converting the action request to a control signal; and providing the control signal to a trace debug circuit, wherein the trace debug circuit is coupled to the sequence processing unit and the one or more processors, the trace debug circuit is configured to perform a trace of the one or more processors, the trace includes monitoring one or more of instruction, data, and watchpoint buses of the one or more processors and recording information determined from said monitoring, and the trace debug circuit controls the trace in response to the control signal. Item 10 includes the method of item 9, wherein said converting the action request to a control signal further includes searching a lookup table for an entry comprising the action request, wherein the lookup table includes entries associating action requests with action definitions; and generating the control signal in response to the action definition. Item 11 includes the method of item 9, wherein the trace debug circuit performs one of starting or stopping the trace in response to the control signal. Item 12 includes the method of item 11, wherein the trace includes one or more of a data trace, an ownership trace, a program trace and a watchpoint trace. Item 13 includes the method of item 9, wherein the trace debug circuit, in response to the control signal, performs a method including capturing one of a counter or timer value; and placing the value into a trace stream, wherein the trace stream comprises information received during said monitoring. Item 14 includes the method of item 9, wherein the trace debug circuit, in response to the control signal, performs a method including capturing a global time base value of a system including the one or more processors, the sequence processing unit and the trace debug circuit; and placing the global time base value into a trace stream, wherein the trace stream includes information received during said monitoring.

Item 15 includes a method performed by a sequence processing unit, the method includes generating a control signal for a trace debug circuit, wherein the trace debug circuit is configured to perform actions related to a trace of a processor, bus, or peripheral in response to the control signal, and a system on a chip comprises the processor, bus, or peripheral, the trace debug circuit, and the sequence processing unit; and transmitting the control signal to the trace debug circuit. Item 16 includes the method of item 15 and further includes generating an action request in response to one or more state conditions associated with the system on a chip; and performing said generating the control signal using the action request. Item 17 includes the method of item 16 wherein said performing said generating the control signal further includes searching a memory for an entry including an action associated with the action request; and generating the control signal in response to the action associated with the action request. Item 18 includes the method of item 17, wherein the control signal is configured to cause the trace debug circuit to perform one of starting or stopping one or more of a data trace, an ownership trace, a program trace and a watchpoint trace. Item 19 includes the method of item 17 wherein the control signal is configured to cause the trace debug circuit to capture one of a counter or timer value and place the value into a trace stream in response to the control signal. Item 20 includes the method of item 17 wherein the control signal is configured to cause the trace debug circuit to capture a global time base value and place the value into a trace stream in response to the control signal.

What is claimed is:

1. A system comprising:
one or more processors;
one or more trace debug circuits, coupled to the one or more processors, and configured to
monitor one or more of instruction, data, and watchpoint buses of the one or more processors, and
record information determined from said monitoring; and
a sequence processing unit, coupled to the one or more trace debug circuits, and configured to provide a control signal to a trace debug circuit of the one or more trace debug circuits, wherein
in response to the control signal, the trace debug circuit controls one or more of said monitoring and recording, and
a system on a chip comprises the one or more processors, the one or more trace debug circuits, and the sequence processing unit, and
wherein the trace debug circuit is configured to:
capture a global time base value of the system and place the value into a trace stream in response to the control signal, wherein the trace stream comprises information received during said monitoring.

2. The system of claim 1 wherein the sequence processing unit further comprises an action unit configured to convert a received action request into the control signal.

3. The system of claim 2 wherein the sequence processing unit further comprises:

a state machine configured to provide the action request to the action unit, wherein the action request is generated in response to state conditions associated with the one or more processors.

4. The system of claim 2 wherein the sequence processing unit further comprises:
a memory, coupled to the action unit, and storing one or more entries associating action requests with actions; and
the action unit is further configured to
search the memory for an entry comprising an action associated with the action request, and
generate the control signal in response to the action associated with the action request.

5. The system of claim 1 wherein the trace debug circuit performs one of starting or stopping a trace in response to the control signal, wherein
the trace comprises said monitoring and recording.

6. The system of claim 5 wherein the trace comprises one or more of a data trace, an ownership trace, a program trace and a watchpoint trace.

7. The system of claim 1 wherein the trace debug circuit is configured to:
capture one of a counter or timer value and place the value into a trace stream in response to the control signal, wherein
the trace stream comprises information received during said monitoring.

8. A method performed by a sequence processing unit coupled to one or more processors, the method comprising:
generating an action request in response to one or more state conditions associated with the one or more processors;
converting the action request to a control signal; and
providing the control signal to a trace debug circuit, wherein
the trace debug circuit is coupled to the sequence processing unit and the one or more processors,
the trace debug circuit is configured to perform a trace of the one or more processors,
the trace comprises monitoring one or more of instruction, data, and watchpoint buses of the one or more processors and recording information determined from said monitoring,
the trace debug circuit controls the trace in response to the control signal, and
the trace debug circuit, in response to the control signal, performs a method comprising:
capturing a global time base value of a system comprising the one or more processors, the sequence processing unit and the trace debug circuit; and
placing the global time base value into a trace stream, wherein the trace stream comprises information received during said monitoring.

9. The method of claim 8 wherein said converting the action request to a control signal further comprises:
searching a lookup table for an entry comprising the action request, wherein
the lookup table comprises entries associating action requests with action definitions; and
generating the control signal in response to the action definition.

10. The method of claim 8 wherein the trace debug circuit performs one of starting or stopping the trace in response to the control signal.

11. The method of claim 10 wherein the trace comprises one or more of a data trace, an ownership trace, a program trace and a watchpoint trace.

12. The method of claim 8 wherein the trace debug circuit, in response to the control signal, performs a method comprising:
capturing one of a counter or timer value; and
placing the value into a trace stream, wherein the trace stream comprises information received during said monitoring.

13. A method performed by a sequence processing unit, the method comprising:
generating a control signal for a trace debug circuit, wherein
the trace debug circuit is configured to perform actions related to a trace of a processor, bus, or peripheral in response to the control signal, and
a system on a chip comprises the processor, bus, or peripheral, the trace debug circuit, and the sequence processing unit; and
transmitting the control signal to the trace debug circuit, wherein the control signal is configured to cause the trace debug circuit to capture a global time base value and place the value into a trace stream in response to the control signal.

14. The method of claim 13 further comprising:
generating an action request in response to one or more state conditions associated with the system on a chip; and
performing said generating the control signal using the action request.

15. The method of claim 14 wherein said performing said generating the control signal further comprises:
searching a memory for an entry comprising an action associated with the action request; and
generating the control signal in response to the action associated with the action request.

16. The method of claim 15 wherein the control signal is configured to cause the trace debug circuit to perform one of starting or stopping one or more of a data trace, an ownership trace, a program trace and a watchpoint trace.

17. The method of claim 15 wherein the control signal is configured to cause the trace debug circuit to capture one of a counter or timer value and place the value into a trace stream in response to the control signal.

* * * * *